United States Patent [19]
Loos et al.

[11] 3,994,373
[45] Nov. 30, 1976

[54] ARRANGEMENT FOR GUIDING ENERGY CONVEYING MEANS

[75] Inventors: Kurt Loos, Netphen-Dreis-Tiefenbach; Werner Moritz, Siegen, both of Germany

[73] Assignee: Kabelschlepp Gesellschaft mit beschrankter Haftung, Siegen, Germany

[22] Filed: Dec. 16, 1974

[21] Appl. No.: 533,309

[30] Foreign Application Priority Data
Dec. 15, 1973 Germany............................ 2362463

[52] U.S. Cl. ................................ 191/12 C; 248/52
[51] Int. Cl.² ............................................. H02G 11/00
[58] Field of Search .................... 191/2, 12 R, 12 C; 248/49, 51, 52; 59/78.1; 294/88

[56] References Cited
UNITED STATES PATENTS

| | | | |
|---|---|---|---|
| 2,864,907 | 12/1958 | Waninger............................ | 191/12 C |
| 3,157,376 | 11/1964 | Merker et al. ..................... | 248/52 X |
| 3,161,205 | 12/1964 | Merker .............................. | 191/12 C |
| 3,237,980 | 3/1966 | Helms................................ | 294/88 X |
| 3,382,668 | 5/1968 | Berkes et al. ..................... | 248/51 |
| 3,388,222 | 6/1968 | Eriksson........................... | 191/12 R |
| 3,446,159 | 5/1969 | Lawson............................. | 191/12 R |
| 3,512,656 | 5/1970 | Koller............................... | 294/88 X |
| 3,551,612 | 12/1970 | Guentner.......................... | 191/12 C |
| 3,653,401 | 4/1972 | Beeler.............................. | 191/12 R |
| 3,716,986 | 2/1973 | Cork et al......................... | 248/52 X |

FOREIGN PATENTS OR APPLICATIONS
269,694  5/1962  Australia........................... 191/12 C Primary Examiner—Evon C. Blunk
Assistant Examiner—Richard K. Thomson
Attorney, Agent, or Firm—Walter Becker

[57] ABSTRACT

A chain arrangement for guiding energy conveying conduits and the like from a fixed point to a horizontally movable consumer in which the movement of the consumer is substantial. The chain consists of links which are pivotally interconnected and which have webs which support the conduits. The chain links abut on one side of the pivots therebetween when the chain is horizontal and on the other side when the chain is flexed. The chain leads horizontally from the fixed point and around a semicircular portion and horizontally back to the consumer which is beneath the fixed point. The arrangement includes support members detachably engageable beneath the straight portion of the chain leading from the fixed point so that the length of the straight reach of the chain extending from the fixed point is never so great that it will sag. The support means for the chain is movable into and out of engagement with the chain as the consumer moves relative to the fixed point to permit the curved portion of the chain to pass freely past the support members.

4 Claims, 13 Drawing Figures

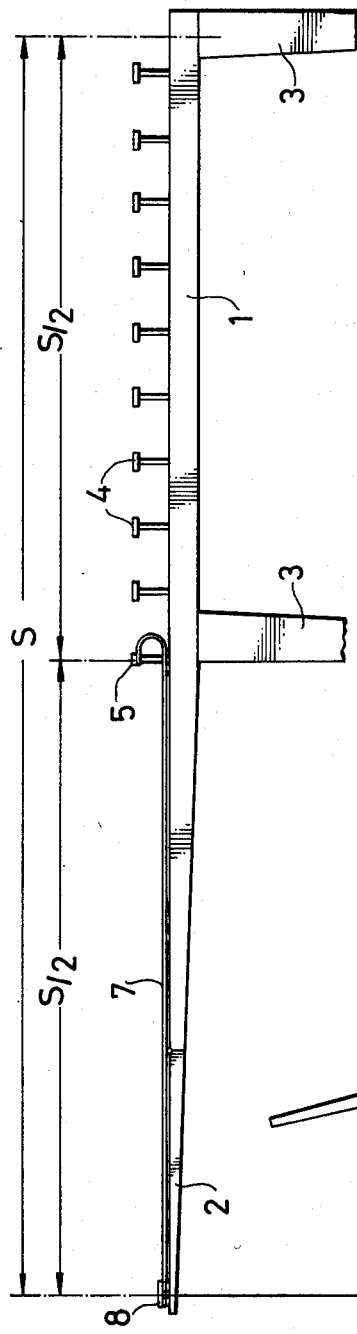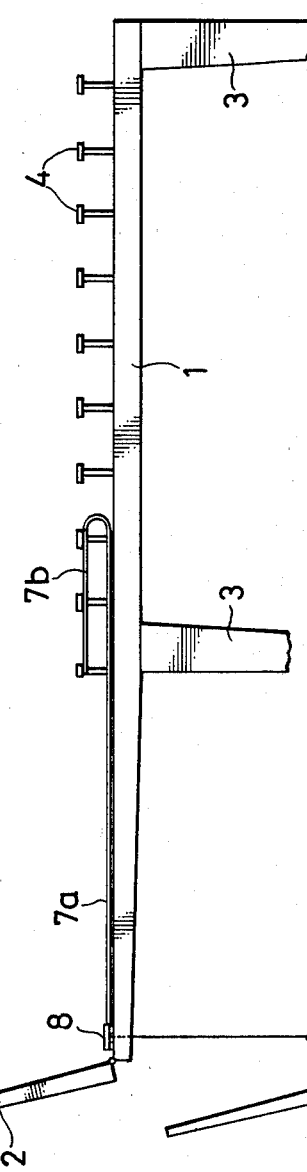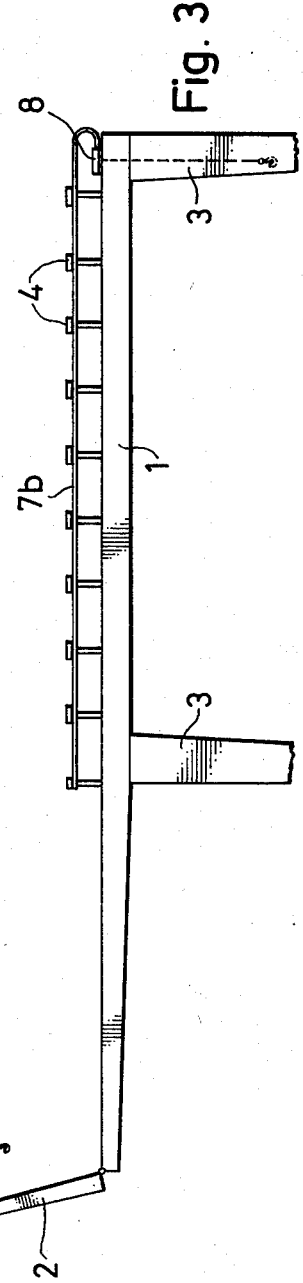

ARRANGEMENT FOR GUIDING ENERGY CONVEYING MEANS

The present invention relates to an arrangement for the guiding of energy conveying means from a fixed point to a movable consumer, for instance a trolley of a crane, while employing an energy conveying chain which comprises two link chains moving parallelly to each other and furthermore comprising webs or stays which interconnect said two link chains and have openings for receiving the energy conveying means such as conduits or electric cables.

Energy conveying chains are known as to their fundamental construction. These known energy conveying chains comprise two supporting link chains which are parallel to each other, and furthermore comprise webs or stays which interconnect said link chains and are provided with passages for receiving energy conveying lines, while the links of the link chains permit only a limited pivot angle relative to each other the magnitude of which corresponds to the admissible bending radius of the most sensitive energy conveying line. The abutments or the abutment surfaces of the links which abutments or abutment surfaces are arranged opposite to each other are, as a rule, designed in such a way that the energy conveying chain in the upper section assumes a straight position and carries itself. Due to the weight of the energy conveying lines and the energy conveying chain itself, the free supporting length of an energy conveying chain is limited to a certain extent which must not be exceeded since otherwise the danger of bending through might occur.

In order to be able to increase the maximum displacement stroke of the movable consumer, it has also been suggested to support the energy conveying chain by a carriage. However, also when employing such auxiliary construction, the maximum displacement stroke of the movable consumer is still too short to make possible the employment of the energy conveying chain on crane installations which require a displacement stroke of about or in excess of 100 meters.

Displacement strokes of and beyond 100 meters are customary for instance in connection with loading bridges of quay installations. In this connections, a particular difficulty consists in that the front cantilever-like end of a loading bridge may be designed so that it can be folded upwardly. In such instances, the employment of the trolley for supporting the energy conveying chain is not possible at all because this trolley would still be standing on the upwardly folded part of the loading bridge when the movable consumer has already been drawn back behind the folding joint. In view of these difficulties, the heretofore known energy conveyind chains could not be used in connection with crane installations or loading bridges having a displacement stroke of or about 100 meters. It is customary on this type of crane installations or loading bridges to employ as guiding means for the energy conveying lines suspended cable installations. These suspended cable installations, however, have the drawback that in particular the expensive electric cables are subjected to strong mechanical stresses and can easily be damaged.

It is, therefore, an object of the present invention to provide an arrangement for guiding energy conveying lines from a fixed point to a movable consumer while employing a heretofore known energy conveying chain by means of which extremely long displacement strokes of about or beyond 100 meters can be bridged at driving speeds of 200 meters per minute. Moreover, it is also an object of the invention to overcome the drawbacks of the state of the art as listed above.

These and other objects and advantages of the invention will appear more clearly from the following specification in connection with the accompanying drawings, in which:

FIG. 1 shows a side view of a foldable loading bridge with fully moved out trolley.

FIG. 2 shows a side view of a loading bridge according to FIG. 1 but with the trolley partly moved in.

FIG. 3 shows in side view the same loading bridge as is shown in FIG. 2 but with fully moved-in trolley.

Figure 4:
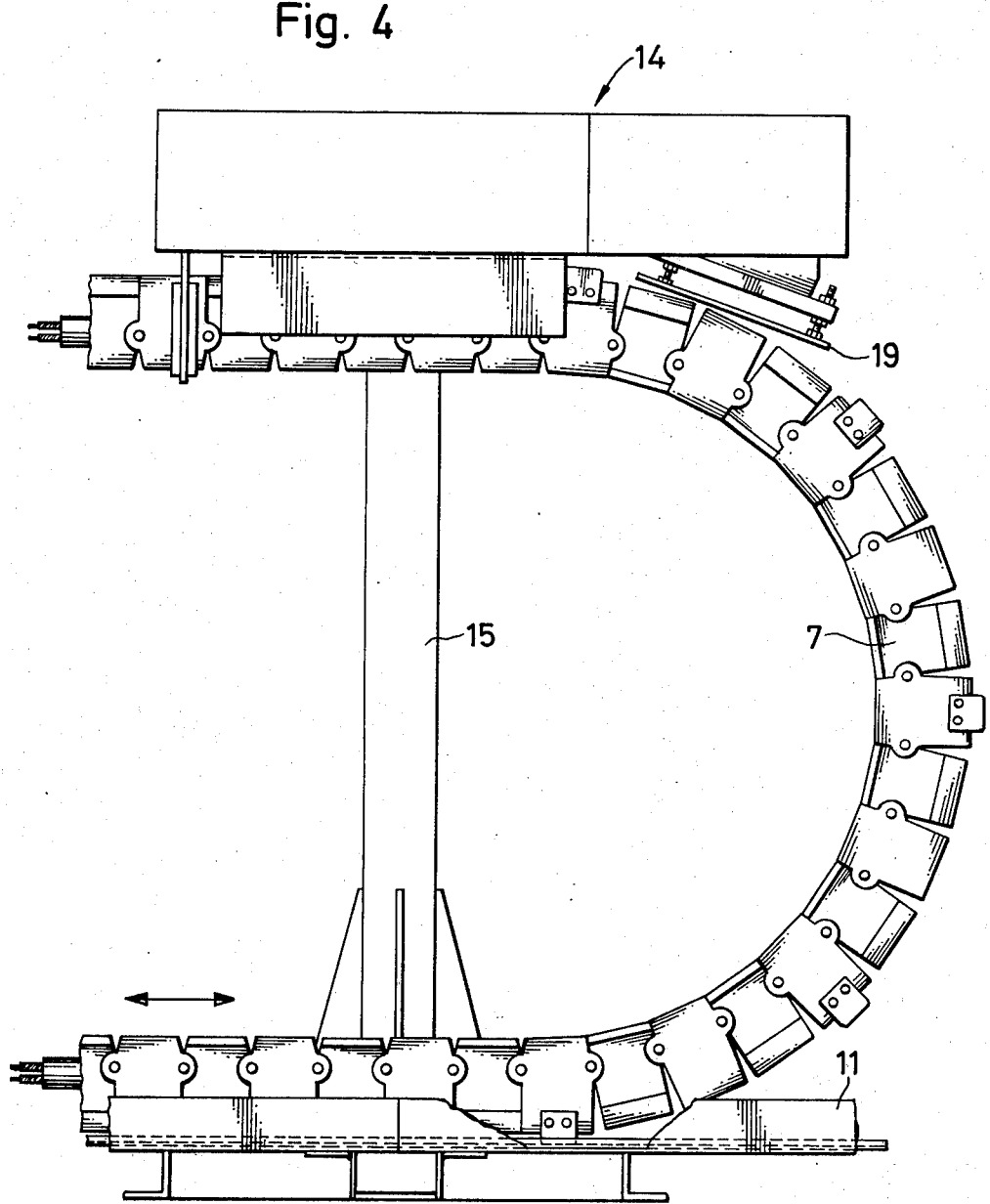
FIG. 4 is a side view of a mechanically controlled chain gripper support with control pressure pads working against return springs.
Figure 5:
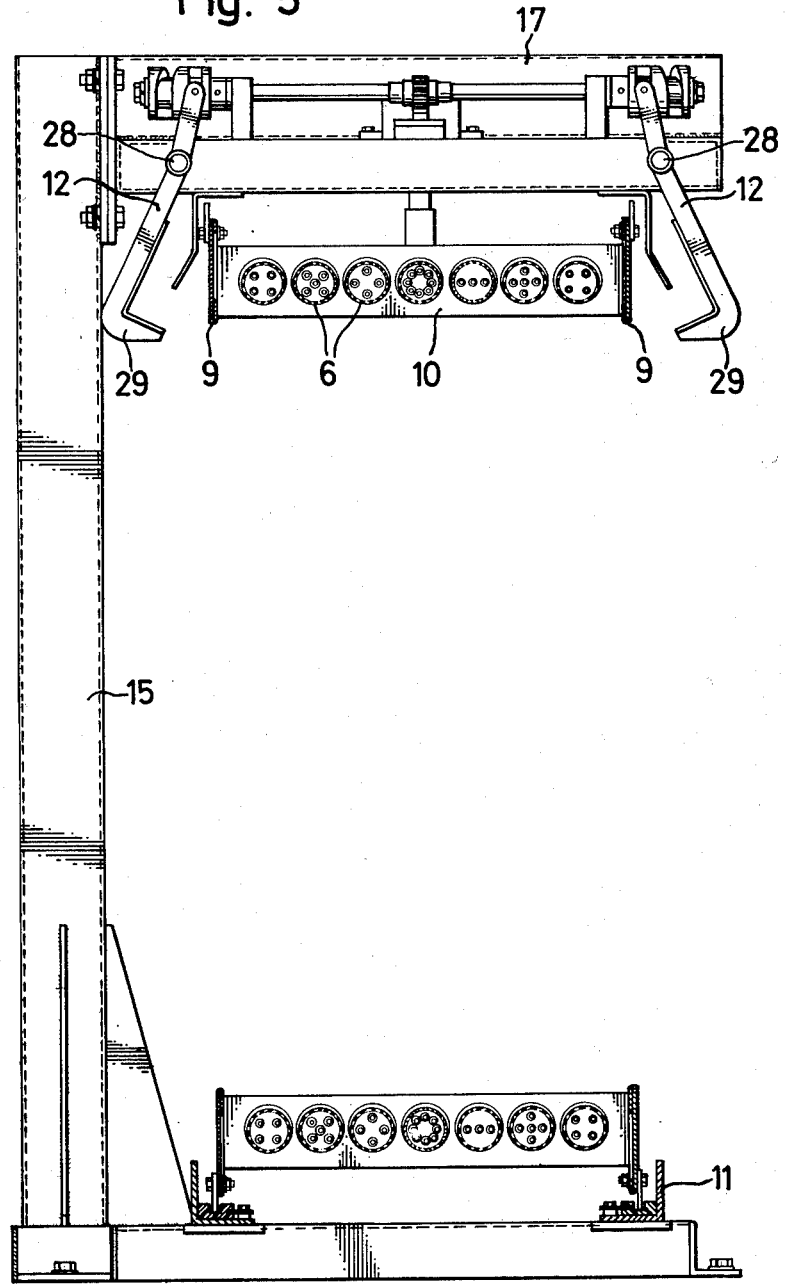
FIG. 5 shows the same chain gripper support as seen in the longitudinal direction of the energy conveying chain.
Figure 6:
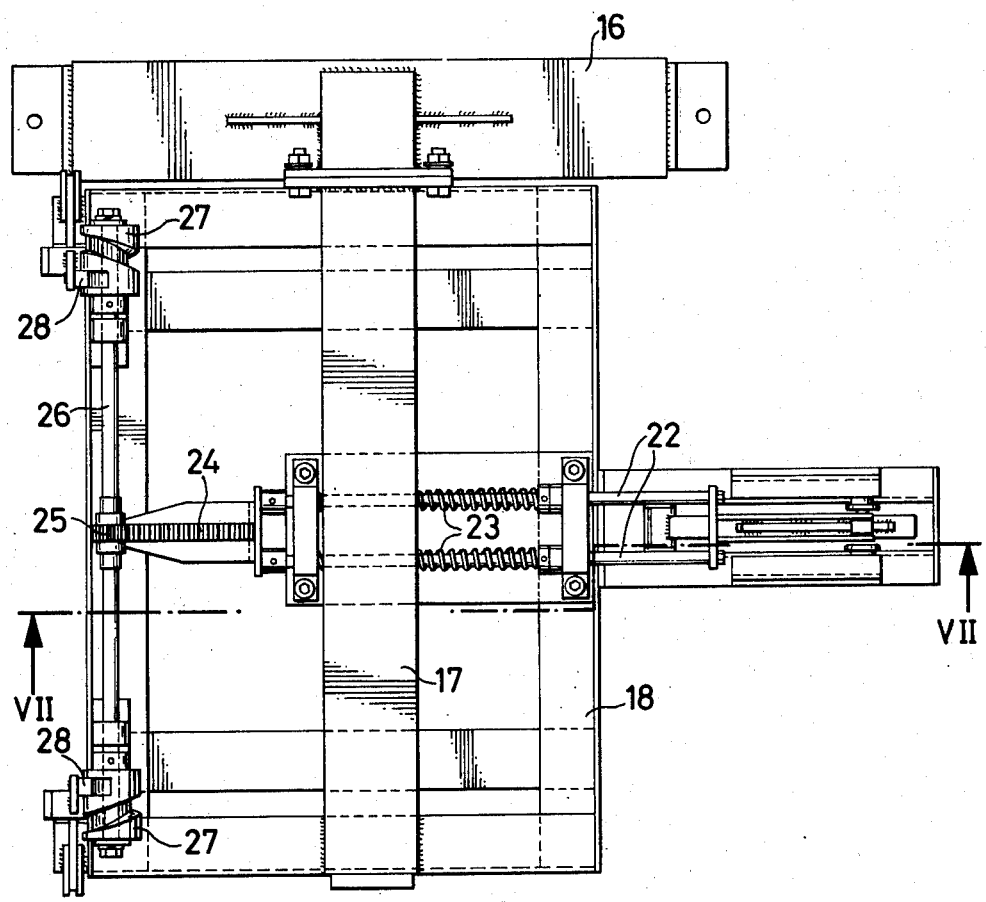
FIG. 6 shows a top view of the same chain gripper support.
Figure 7:
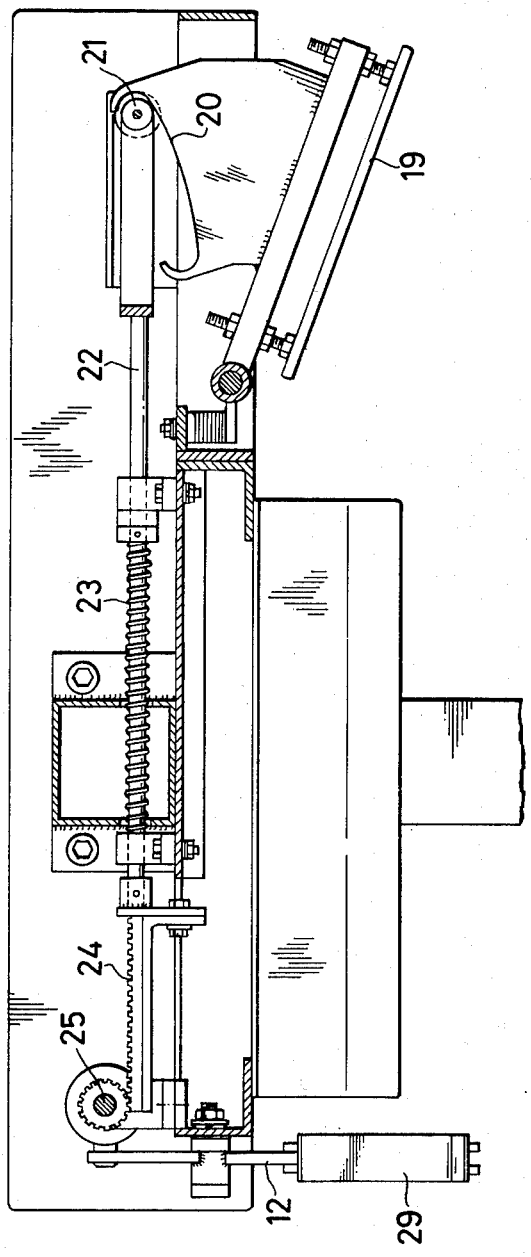
FIG. 7 is a section taken along the line VII—VII of FIG. 6.

The problem underlying the present invention has been solved according to the present invention by arranging the movable consumer (trolley) at the free front end of the lower section moved on a guiding path of the energy feeding chain, and by having the upper resting section suspended by a distance of its caltilever-like section on chain grippers controlled by the energy conveying chain itself. The chain grippers may be designed as two-arm levers having their free lower ends provided with supporting angles while their upper end is adapted to be opened and closed by means of a mechanical, pneumatic or electrical control. The fixed connection for the conduits in the energy conveying chain is located approximately in the middle of the entire displacement stroke.

Due to the design according to the invention, the employement of the heretofore known energy conveying chain with the advantages inherent thereto, namely relief of pull on the energy conveying lines and a protected mounting of said energy conveying lines in the transverse webs has been made possible also in crane installations or loading bridges with extremely large displacement strokes. A further advantage of the present invention consists in that the maximum displacement stroke of the movable consumer (trolley) arranged at the front free end of the energy conveying chain corresponds approximately to twice the length of the energy conveying chain and the energy conveying lines arranged therein.

According to a practical embodiment of the invention, the mechanical control for the chain grippers may comprise control pressure pads extending into the path of movement of the upper section of the energy conveying chain, and furthermore may comprise connecting rods and controls shafts with control rolls by means of which the chain grippers may be closed successively when the movable consumer moves back below the upper section of the energy conveying chain, and may successively be opened again during the advance of the movable consumer.

According to another practical embodiment of the invention, the pneumatic control for the chain grippers may consist primarily of control valves extending into the path of movement of the upper section of the energy conveying chain and may additionally consist of cylinders which are arranged between the chain grippers and may furthermore comprise unilaterly or double acting cylinder piston systems and a pertaining compressed air installation.

Finally, according to another practical embodiment of the invention, it is possible that the electrical control for the chain gripper consists of switches extending into the path of movement of the upper section of the energy conveying chain and of electromagnets arranged between the chain grippers.

Referring now to the drawings in detail, FIGS. 1 to 3 show a loading bridge which has its free front end provided with a foldable section 2. A plurality of chain gripper supports 4 spaced from each other are arranged on the right-hand section of the loading bridge 1 which right-hand section is supported by two posts 3. In the front chain gripper support there is also provided a stationary connection for various energy conveying lines 6 (FIG. 13), which are arranged in an energy conveying chain 7 and lead to a movable consumer. In this particular example shown in the drawing, the movable consumer consists of a trolley 8. The energy conveying chain 7 is, as far as a general construction is concerned, known and in the specific shown in the drawing comprises two link chains extending parallelly to each other and having their links provided with diverging abutment edges so as to thereby permit only a limited pivot angle, the two chains 9 are interconnected by webs 10 having bores therein for receiving the energy conveying lines 6.

According to the embodiment shown in FIGS. 1 to 3, the loading bridge 1 has a displacement stroke S which may amount to 100 meters or more. The length of the energy conveying chain 7 between the stationary connection 5 and the trolley 8 amounts to only half the displacement stroke S. When the trolley 8 is located at the front free end of the foldable section 2 of the loading bridge 1, the lower section 7a of the energy conveying chain 7 has been deposited completely on a guiding path 11. When the trolley 8 is being moved back, it pushes the lower section 7a of the energy chain 7 ahead of itself and into the upper section 7b. Within the region of the upper section 7b being formed, the chain gripper supports 4 are arranged spaced by the self-supporting length of the energy conveying chain 7. Provided on the chain gripper supports 4 are chain grippers 12 embodied as two-arm levers which are mechanically, pneumatically or electrically controlled by the upper section 7b of the energy conveying chain and from both sides catch below the link chains 9 of the upper section 7b of the energy conveying chain. When the trolley 8 is being moved from its FIG. 3 rear position toward the front, the chain grippers 12 open successively prior to the uper section 7b merging with the lower section 7a.

The arrangement illustrated in FIG. 1–3 has the advantage that the movable consumer in the form of the trolley 8 will be at the front end of the energy conveying chain 7 so that in the position shown in FIG. 2, the front folding secion 2 of the loading bridge 1 can be folded upwardly. The chain gripper supports spaced by the self-supporting length of the energy conveying chain 7 permit in combination with the arrangement of the invention of the movable consumer at the front end of the chain section 7a of the energy conveying chain 7 the bridging of a displacement part S which may amount to 100 meters and more.

FIGS. 4 to 7 illustrate details of a mechanically controlled chain gripper support 14. Adjacent the guiding path 11 there is fastened a support 15 which at its upper end carries a bottom foot 16 and a transverse beam 17. Below the transverse beam 17 there is arranged a frame 18 having linked thereto a control pad 19 which extends into the path of movement of the energy conveying chain 7. The pad 19 acts through a curved coulisse 20 upon rollers 21 which are mounted on the extended ends of connecting rods 22. The two connecting rods 22 can, against the thrust of return springs 23, be displaced forwardly by means of the pad 19. At the front end, the connecting rods carry a gear rack 24 meshing with a pinion 25 on a control shaft 26. Connected to the ends of the control shaft are two cam guiding means 27 engaged by roller pins 28 connected to the chain grippers. These mechanical chain gripper supports 14 function in the following manner.

In rest position, the control pad 19 extends into the path of movement of the energy conveying chain 7, and the chain grippers 12 are open. As soon as the control pad 19 is lifted by the energy conveying chain 7, the two connecting rods 22 are against the thrust of the return springs 23 moved forwardly while the gear rack 24 through the intervention of the pinion 25 turns the control shaft 26. The chain grippers 12 are pivoted at their roller pins 28 so that the energy conveying chain 7 is underpinned by supporting angle 29 at the lower end of the chain gripper 12. As soon as the pad 19 is again freed by the energy conveying chain 7, the return springs 23 push the pushrods 22 back to their starting position and thereby pivot the supporting angles 29 of the chain gripper 12 again toward the outside.

Figure 8:
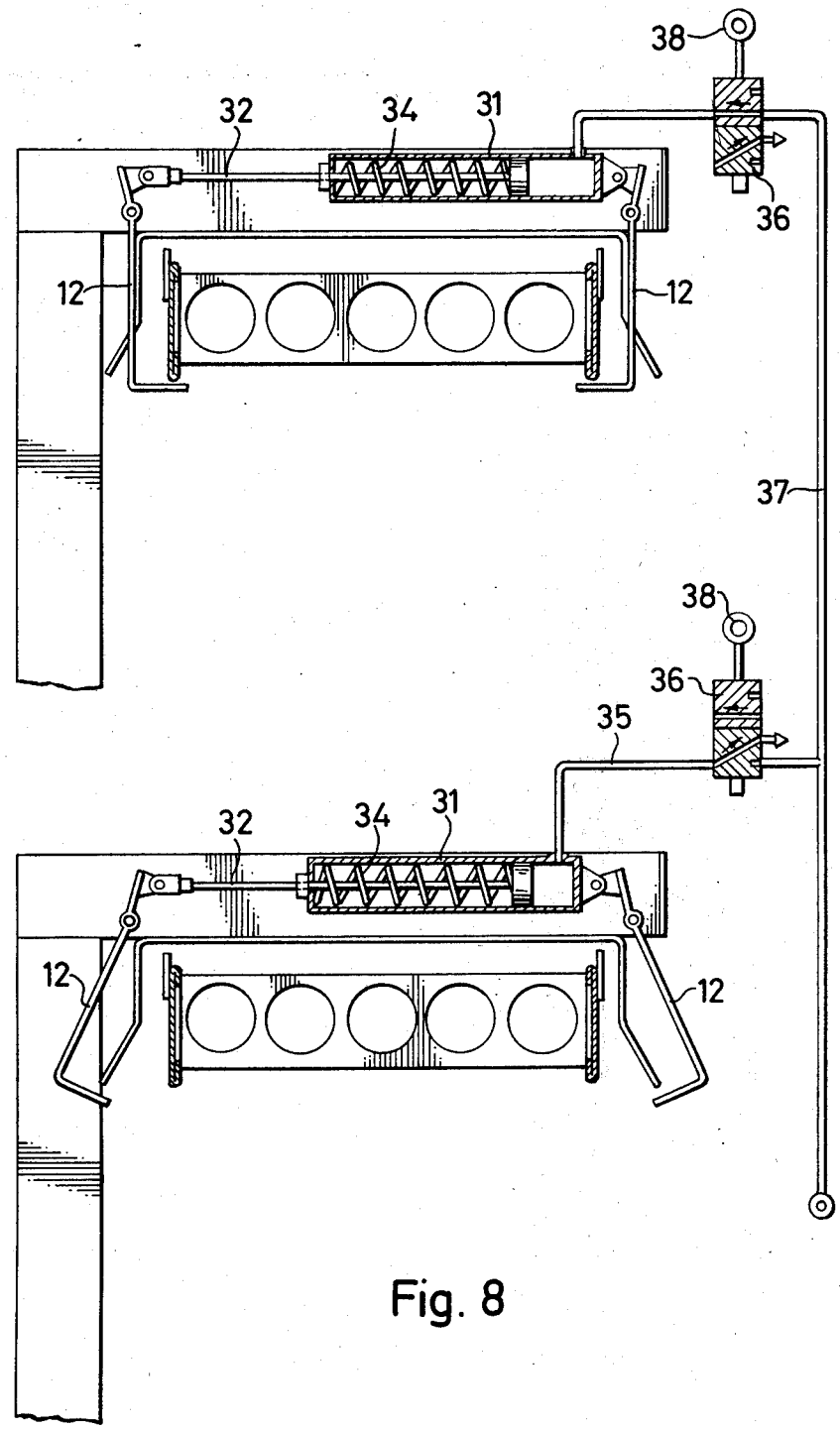
FIG. 8 is a circuit with two pneumatically controlled chain gripper supports and with unilaterally acted upon cylinder piston systems.

FIG. 8 shows a control circuit with two pneumatically controlled chain gripper supports. Between the upper ends of the chain grippers 12 designed as two-arm levers there are arranged unilaterally acting cylinder piston systems 31 while on one hand the housing and on the other hand a piston rod 32 are linked to the upper end of the chain gripper 12 designed as two-arm levers. Between a piston 33 and the housing of the cylinder 31, a return spring 34 is arranged on the piston rod 32. The cylinders 31 are, through conduits 35, in communication with a compressed air conduit 37, said conduits 35 having interposed therein two-way valves 36. Each two-way valve 36 has a key 38 which extends into the path of movement of the energy conveying chain 7. The function of these pneumatically controlled chain gripper supports is extremely simple.

When in rest position, the chain grippers 12 are open. As soon as a two-way valve 36 is contacted by the energy conveying chain 7, the valve shifts over into its through-pass position so that compressed air flows into the cylinder piston system 31, and the chain grippers 12 are folded inwardly at the lower end. As soon as the key 38 is again relieved from the energy conveying chain 7, the corresponding two-way valve 36 shifts into its venting position so that the chain grippers 12 under the influence of the return spring 34 are agian contracted at the upper end, which means are folded outwardly.

Figure 9:
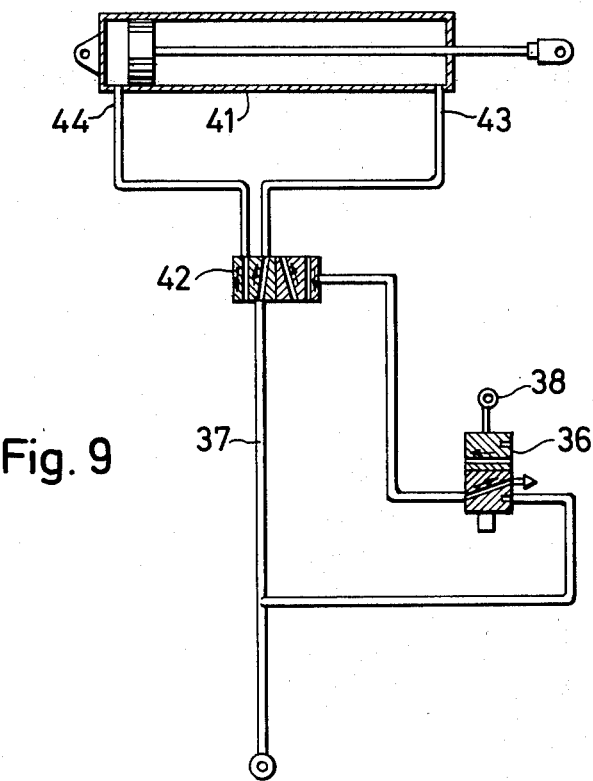
FIG. 9 is a circuit with a double acting cylinder piston system for employment in a chain gripper support according to FIG. 8.

FIG. 9 shows a double acting cylinder piston system 41 which instead of the single cylinder piston system 31 used in FIG. 8 may be inserted between the upper ends of the chain grippers 12. In this instance, the two-way valve 36 with the key 38 is arranged in parallel to the compressed air line 37 while still a further two-way valve 42 is employed for feeding compressed air through conduits 43, 44 to the two chambers of the cylinder piston system 41 or to permit the alternate venting of these two chambers.

Figure 12:
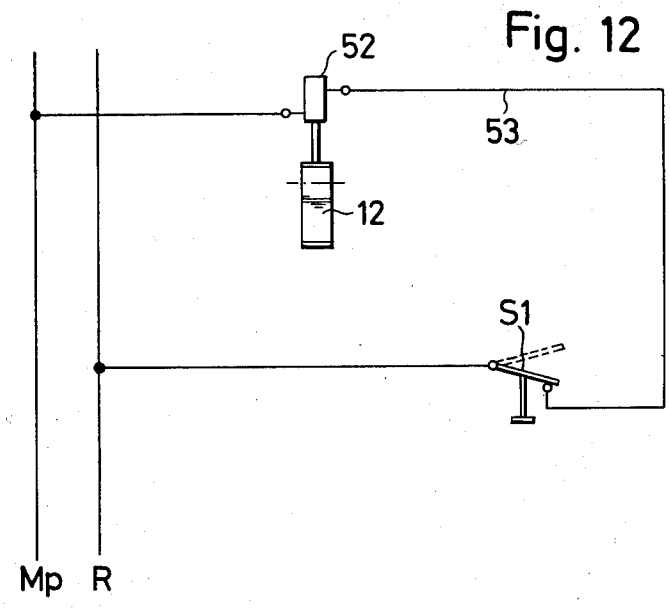
FIG. 12 represents a circuit for the electrically controlled chain gripper support as illustrated in FIGS. 10 and 11.
Figure 10:
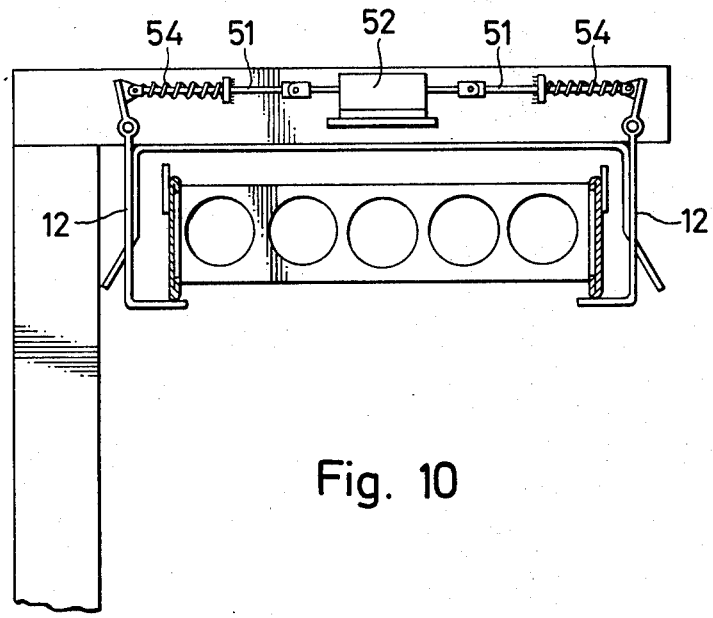
FIG. 10 shows an electrically controlled chain gripper support with inwardly folded chain grippers as seen in the longitudinal direction of the energy feeding chain.
Figure 11:
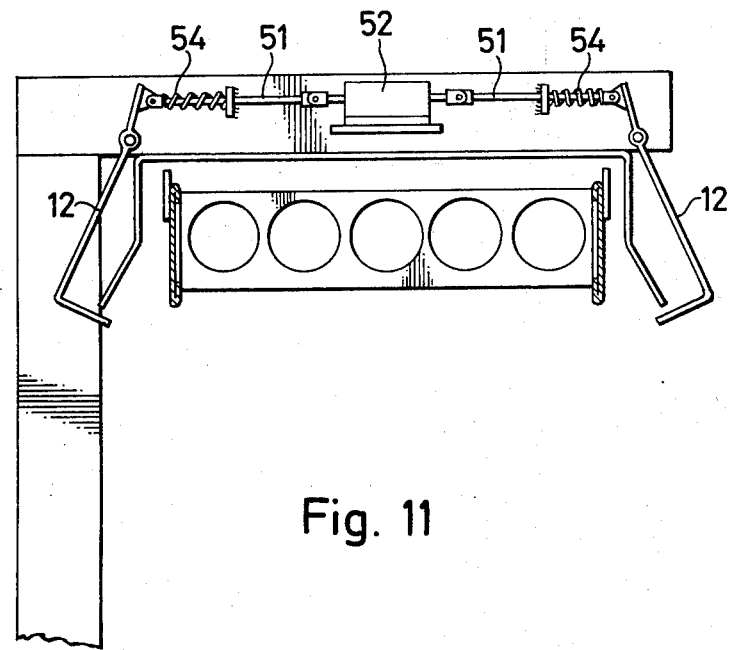
FIG. 11 shows the same chain gripper support as FIG. 10 but with the chain grippers pivoted outwardly.

FIGS. 10–12 illustrate an electrically controlled chain gripper support 4 in which between the upper ends of the chain grippers 12 there are arranged pull and pressure rods 51 cooperating with an electromagnet 52. When in rest position, which means also in case of an accidental failure of the electric current supply, the two chain grippers 12 occupy the position shown in FIG. 10 in which they are folded inwardly or folded together. As soon as the circuit 53 at the electromagnet 52 on the switch S1 is closed by the downwardly escaping energy conveying chain 7, the energized electromagnet 52 pulls the pull and pressure rods 51 together as a result of which the chain grippers 12 open. As soon as the circuit 53 is again opened or the current fails, return springs 54 press the chain grippers 12 back again into their closed starting position.

Figure 13:
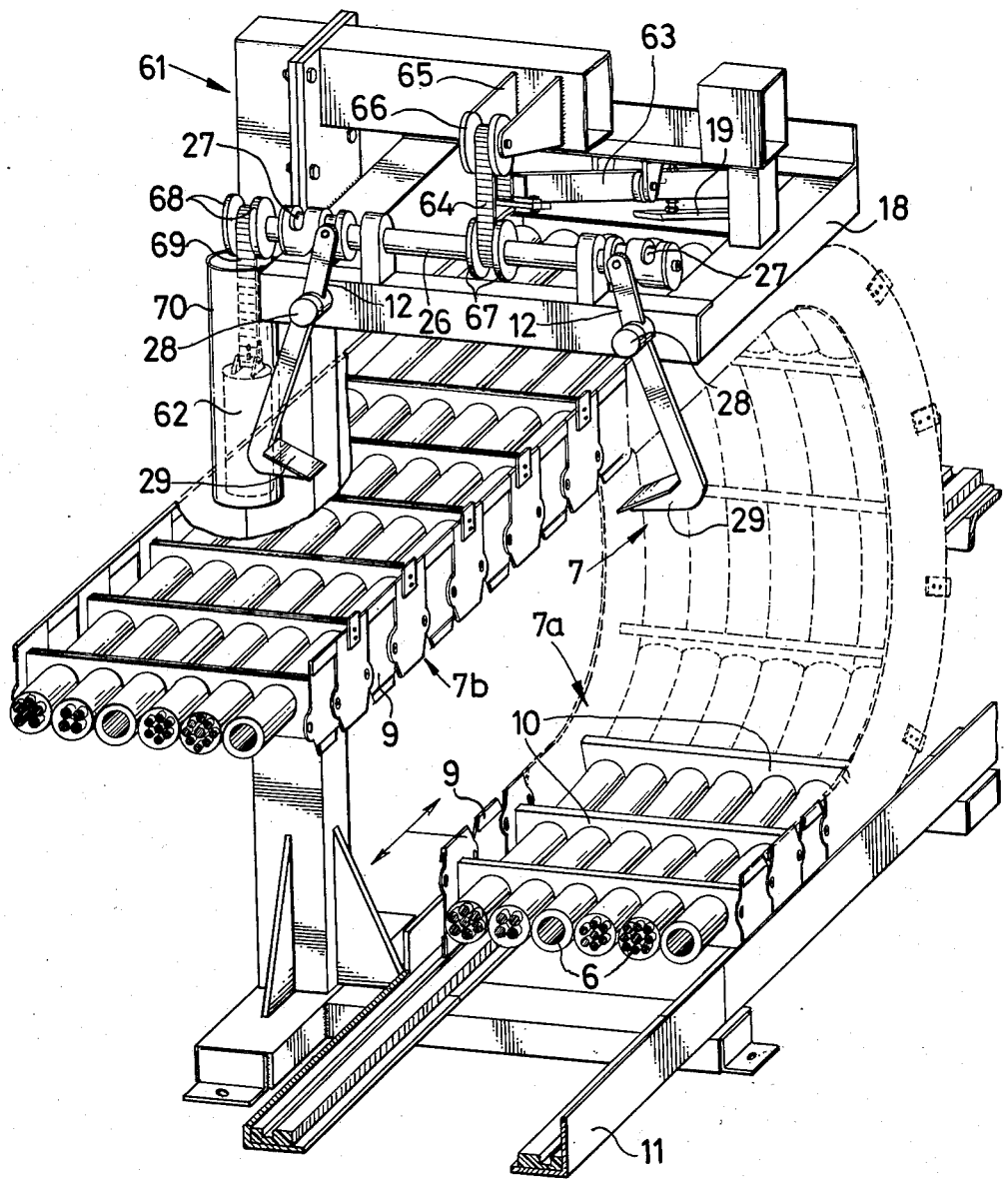
FIG. 13 is an isometric view of a mechanically controlled chain gripper support with a control pressure pad acting against a counterweight.

FIG. 13 shows a mechanically controlled chain gripper support 61 in which the control pad 19 works against a counterweight 62. To this end, the control pad 19 is with a two-arm lever 63 mounted below the frame 18. That end of the pad 19 which is located opposite the end of the lever 63 is connected to a band or belt 64 which passes over a roller 66 arranged on the transverse beam 17 with supports 65 and between the discs 67 is connected to the control shaft 26 for the chain grippers 12. One end of the control shaft 26 is extended and carries buffer discs (Anlaufscheiben) 68 between which a further belt 69 is connected and on the roller end of which the counterweight 62 is suspended in a protective pipe 70.

When in rest position, the pad 19 extends into the path of movement of the energy conveying chain 7, and the chain grippers 12 are open. As soon as the pad 19 is lifted by the energy conveying chain 7, it pulls the counterweight 62 up and simultaneously pivots the chain gripper 12 inwardly. As soon as the pad 19 is again freed, the counterweight 62 pulls at the control shaft 26 and opens the chain grippers 12.

It is, of course, to be understood that the present invention is, by no means, limited to the specific showing in the drawings, but also comprises any modifications within the scope of the appended claims.

What is claimed is:

1. In an apparatus for guiding flexible energy conveying means, such as conduits, from a first point of fixed connection to a second point of connection to a horizontally movable consumer, in which an energy conveying chain having pivotally interconnected links extends between said points and along said conveying means and includes webs which supportingly engage said conveying means, said chain having first and second horizontal sections extending in the same direction from said first and second points respectively and a semicircular portion joining the free ends of said sections, said chain links abutting on one side of the pivotal connections therebetween in said horizontal sections and on the other side in said semicircular portion, frame means including means confining said second section from below and leaving the space between said sections unobstructed, support means carried by the frame means and releasably engageable beneath said first section to support said first section, said support means having improvement therewith which comprises two arm levers pivotally connected to said frame means and having an supporting angles at lower end parts engageable beneath said chain, and actuating means connected to said levers near the upper ends thereof operable for swinging the levers about the pivotal support thereof to dispose said parts beneath the chain or spaced laterally outwardly from said chain, said support means comprising at least one lever on each side of said chain pivotally connected to said frame means and each having supporting angles as elements thereon near the lower end supportingly engageable beneath the respective side of the chain in a first position of the respective arm and spaced outwardly from the chain in a second position of the respective arm, a control shaft rotatable in the frame means and having cam means near each and each engaging and controlling a respective lever, a pressure pad movable on the frame means and actuated by the chain means when said semicircular portion moves past said support means in lengthening direction of said first section, said pressure pad when actuated effecting rotation of said shaft to swing said levers into said first position thereof, and biasing means biasing said levers toward said second position thereof whereby release of said pressure pad will be accompanied by swinging of said levers to the said second position thereof.

2. An apparatus according to claim 1 in which fluid motor means are connected to said levers for actuation thereof, and valve means connected to said fluid motor means to control the supply of fluid and actuated by said chain.

3. An apparatus according to claim 2 in which said fluid motor means is single acting, and spring means acting in opposition to said motor means.

4. An apparatus according to claim 1 in which electromagnetic means are connected to said levers for actuation thereof, and switch means in circuit with said electromagnetic means and actuated by said chain to provide for energization and deenergization of said electromagnetic means.

* * * * *